July 10, 1945.　　　D. HARKER　　　2,380,235
MEANS AND METHOD FOR ORIENTING IRREGULAR QUARTZ CRYSTALS
Filed June 5, 1943　　　2 Sheets-Sheet 1
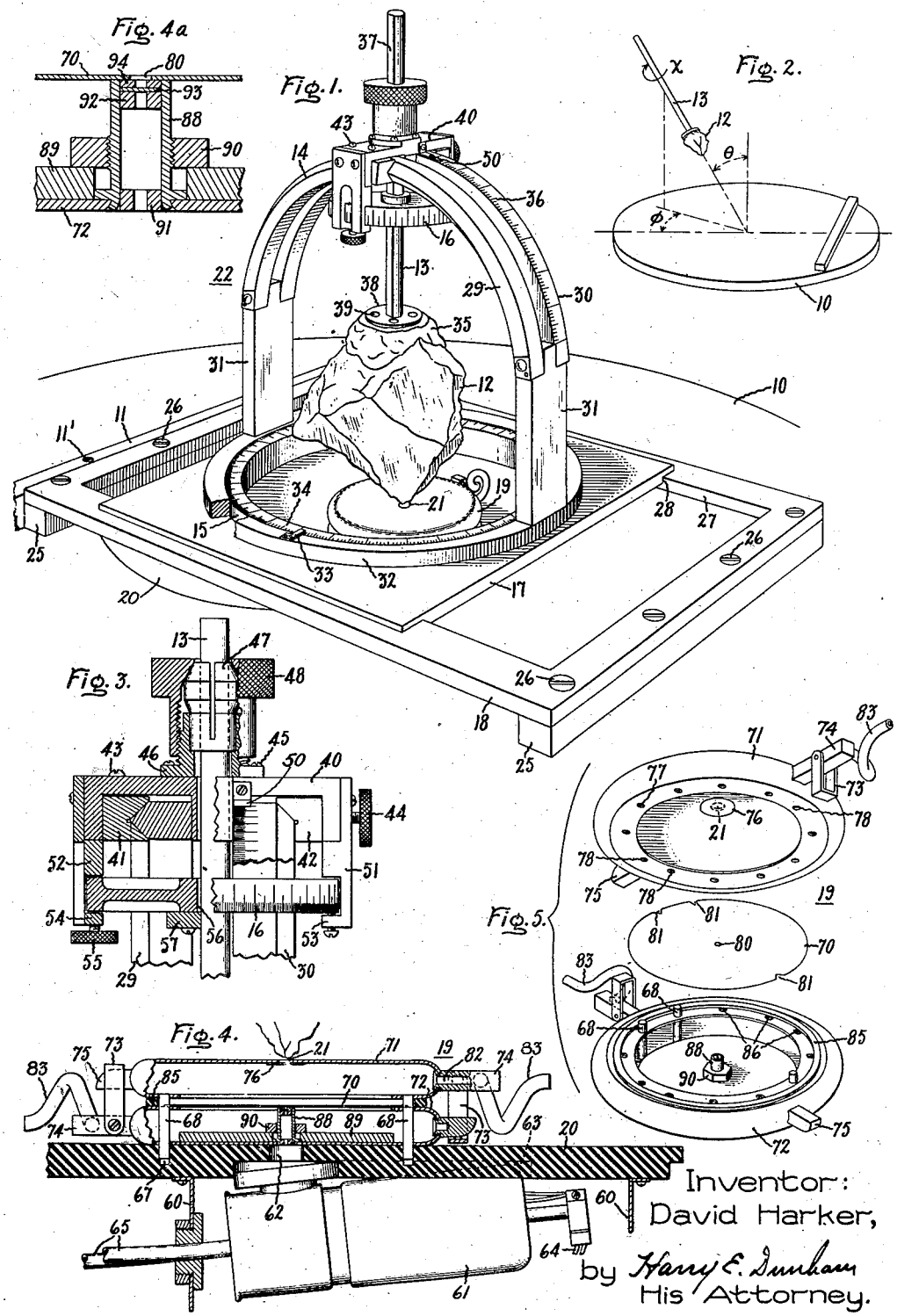
Inventor:
David Harker,
by Harry E. Dunham
His Attorney.

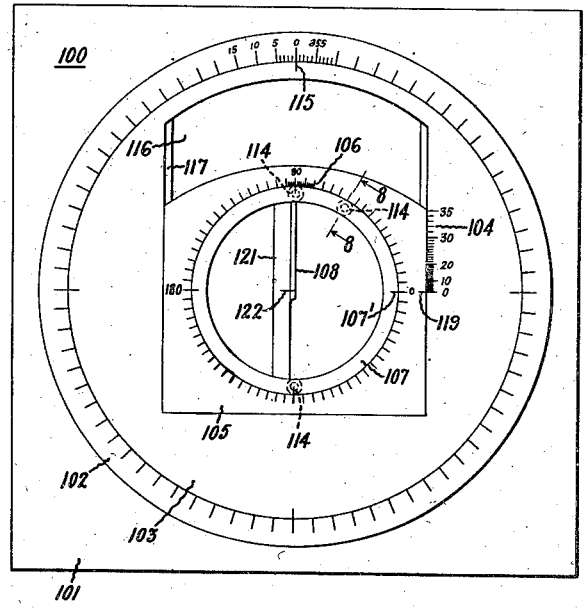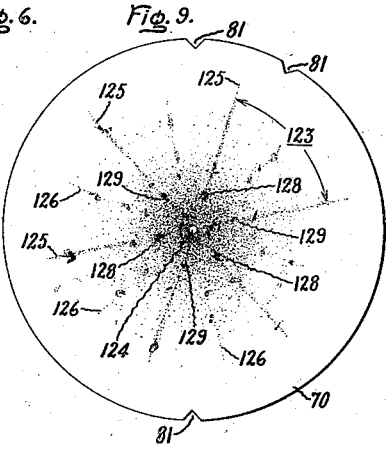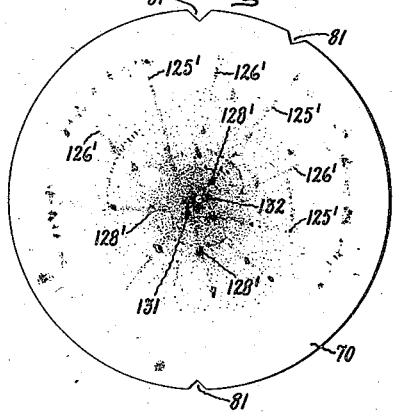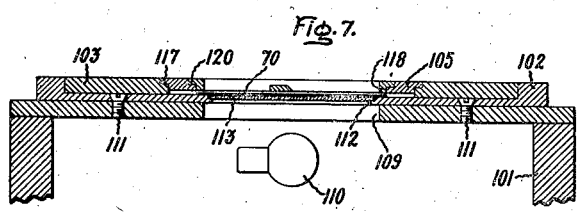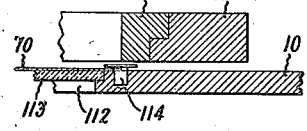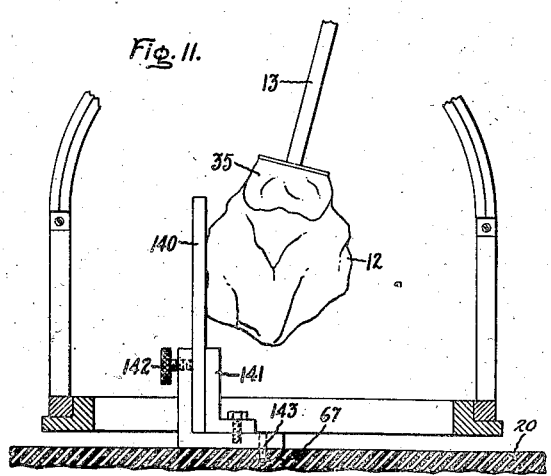

Patented July 10, 1945

2,380,235

UNITED STATES PATENT OFFICE 2,380,235

MEANS AND METHOD FOR ORIENTING IRREGULAR QUARTZ CRYSTALS

David Harker, Alplaus, N. Y., assignor to General Electric Company, a corporation of New York Application June 5, 1943, Serial No. 489,790

21 Claims. (Cl. 250—53)

My invention relates to quartz crystals and, in particular, to a means and a method for determining certain characteristics of such crystals.

Quartz crystals, as they occur in nature, have a typically crystalline form which may be described as a hexagonal prism terminated at each end by structures which are roughly in the form of hexagonal pyramids. The axis of symmetry which is parallel to the fixed edges of the hexagonal prism is called the optical axis of the quartz crystal because this is the direction of the maximum index of refraction. Quartz crystals possess two other sets of characteristic axes, both of which are perpendicular to the optical axis and which are known as the mechanical and electric axes. Each mechanical axis lies in a plane perpendicular to the optical axis and is approximately perpendicular to the intersection of such a plane with two opposite faces of the hexagonal prism. Each electric axis is perpendicular to the optical axis and to a corresponding mechanical axis and extends between opposite corners of the hexagonal prism.

In the manufacture of standard piezo-electric crystal oscillators for radio transmitters and similar uses, it is customary to use the natural faces of the crystals as a means for orienting the crystals for cutting. The supply of quartz crystals having good natural faces, however, is limited and it is desirable to have a satisfactory means for orienting irregular crystals, that is, those having no natural faces. Accordingly, it is an object of my invention to provide an improved method for orienting irregular crystals.

A further object of my invention is to provide a new and improved means and method for determining more readily and accurately the optical axis of a crystal.

Another object of my invention is to provide a new and improved means and method for orienting irregular crystals by the use of X-ray diffraction patterns.

There are certain difficulties encountered in attempting to determine precisely where the optical axis of a perfect quartz crystal lies and it is obviously more difficult to determine such optical axes for crystals which have no regular faces. In the past, polarized light has been used as a means for determining the optical axes of such irregular crystals. Such a method is sufficiently accurate for most purposes, but in many instances it is desirable to be able to orient the crystals to an even greater degree of accuracy. Accordingly, it is a further object of my invention to provide a new and improved means and method for orienting irregular crystals which employs a collimated beam of X-rays to obtain a back reflection X-ray diffraction pattern and which provides an improved means for determining precisely the optical axis of the crystal.

One of the features of my invention is the impinging of a collimated beam of X-rays upon a quartz crystal and the use of a camera interposed between the source of X-ray beam and the crystal to record the back reflection X-ray diffraction pattern. From the recorded diffraction pattern, the true directions of the optic and electric axes are ascertained and the crystal is oriented by means of a goniometer to make the optic axis parallel to the X-ray beam and the electric axis parallel to a standard direction.

A further object of my invention is to provide an improved means and method for determining any desired axis of an irregular crystal which utilizes a camera to record a back reflection X-ray diffraction pattern.

Another object of my invention is to provide an improved apparatus for orienting irregular crystals in which a camera, utilized to record a back reflection X-ray diffraction pattern, also functions as means for locating the crystal-to-film distance in order more precisely to locate the characteristic axes of the crystal.

Still another object of my invention is to provide a new and improved goniometer for analyzing a recorded back reflection X-ray diffraction pattern.

A further object of my invention is to provide a new and improved goniometer for orienting a quartz crystal in accordance with orientation angles determined by a back reflection X-ray diffraction pattern.

Another object of my invention is to provide an improved means and method for orienting irregular crystals which is simple, reliable, and accurate, may be operated by a relatively unskilled person, and which is adapted to production methods.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings, in which Fig. 1 is a perspective view showing certain portions of my crystal orienting apparatus; Fig. 2 is a view illustrating the angular variables of the goniometer head used in the apparatus of Fig. 1; Fig. 3 is a detailed view, partly in section, of a portion of the orienting apparatus of Fig. 1; Fig. 4 is an elevation view, partly in section, of the source of X-ray and the camera used with the apparatus of Fig. 1; Fig. 4a is an enlarged view of the collimating system of the camera shown in Fig. 4; Fig. 5 is an exploded view of the camera shown in Fig. 4; Fig. 6 is a plan view of the film goniometer of my invention; Fig. 7 is a side elevation view of the film goniometer of Fig. 6; Fig. 8 is a view along the lines 8—8 of Fig. 6; Figs. 9 and 10 are views showing typical diffraction patterns obtained with the apparatus of Fig. 1; and Fig. 11 is a view of apparatus used for mounting an oriented crystal. In the several figures, corresponding numerals have been used to designate corresponding parts to facilitate their comparison.

Referring to Fig. 1, I have shown apparatus for obtaining a back reflection X-ray diffraction pattern of a quartz crystal which comprises a suitable working surface or table top 10, upon which is mounted a rectangular bar 11, of steel or any other suitable material, for defining a standard direction and secured thereto by any suitable means, such as the screws 11'. A crystal 12 to be oriented is supported by a rod 13 from a crystal goniometer 22 which comprises an inclination semi-circle 14, an azimuth circle 15, and a rotation circle 16. The inclination semi-circle 14 is mounted for rotation about the azimuth circle 15. The azimuth circle 15 is formed integrally with a plate 17 which is adjustably supported upon a rectangular frame member 18 slidable along the reference bar 11.

A camera 19, located in a predetermined position on a non-metallic insert 20 in the table top 10, has a central opening 21 above which the lowermost point of the crystal 12 may be positioned.

The crystal goniometer 22 is an arrangement whereby the crystal mounted on the rod 13 can be easily set at any desirable angular orientation with respect to the back reflection camera 19. The frame 18, by sliding along the reference bar 11, allows translation of the crystal without changing its angular orientation. As may be seen in Fig. 2, the angular variables are $\chi$, the angle of rotation of the mounting rod about its own axis, which angle is adjusted by means of the rotation circle 16; $\theta$, the inclination of the mounting rod to the perpendicular of the table top, which angle is adjusted by means of the inclination semi-circle 14; and $\phi$, the azimuth of the projection of the mounting rod 13 on the table top 10.

Referring again to Fig. 1, I have shown the frame 18 as comprising an accurately machined rectangular member supported by legs 25 and secured thereto by means of the screws 26. The frame's left-hand edge is abutted against the reference bar 11 so that the longer legs of the frame are exactly perpendicular to this reference bar. The frame 18 has an inner bearing surface 27 along which cooperating shoulders 28 on the plate member 17 may slide. By sliding the frame 18 along the straight edge 11 and the plate 17 bearing the azimuth circle 15 up and down the inner bearing surface of the frame, the center of the azimuth circle may be placed in various positions without changing the orientation of its reference radius with respect to the straight edge 11. This allows the lowest point of the crystal 12 to be brought over the opening 21 of the camera 19 in a manner which will be described later.

The inclination semi-circle 14 consists of two parallel semi-circular slides 29, 30 supported in a vertical plane by two vertical columns 31, each of which is attached to one end of both of the semi-circles. The two columns 31 are fastened at their lowermost ends to a horizontal steel ring 32 which fits over the outer bearing surface of the azimuth circle 15. This ring carries a marker 33, by means of which the azimuth of the plane of the semi-circle can be read on the graduated azimuth circle scale 34. The upper surface of the semi-circular slide 30 carries a scale 36 graduated in degrees so that the inclination of the mounting can be read thereon in a manner to be explained later. The crystal mounting rod 13 is milled off flat on one side 37 and carries a disk 38 at its lowermost end through which are drilled several holes 39. In use, the disk is coated with some convenient adhesive material 35, such as cement, and is brought into contact with the crystal, also coated with a suitable cement, so that the approximate optical axis of the crystal, determined in a manner to be explained later, is parallel to the rod. The cement is then allowed to set.

A supporting and clamping structure for the crystal mounting rod 13, shown in Fig. 3, comprises a movable frame member 40 supported from the inclination semi-circles 29, 30 by means of a pair of block members 41, 42 having V-shaped bearing surfaces for engaging the outer edges of the semi-circles 29, 30. The block member 41 is secured to the frame member 40 by means of screws 43, while block member 42 is movably supported from frame member 40 by means of knurled adjusting screw 44. By tightening the knurled screw 44, the frame member 40 may be held in one position on the inclination semi-circle. Secured to the upper portion of frame 40 by means of screws 45 is a sleeve member 46 having an internal bore for receiving a split chuck 47 through which passes the crystal mounting rod 13. Sleeve member 46 is externally threaded for engaging cooperating threads on a knurled tightening nut 48. The internal surface of the head portion of nut 48 has a flared portion for engaging a cooperating surface on split chuck 47 so that, as the nut 48 is threaded on sleeve member 46, the split chuck 47 grips the crystal mounting rod 13 to either hold the mounting rod rigidly or let it slide freely as desired.

It will be observed that, as the frame member 40 and the bearing blocks 41 slide on the vertical semi-circles 29, 30 of the inclination semi-circle, the crystal mounting rod 13 is supported parallel to a radius of the semi-circle in all positions. The frame member 40 also carries a marker 50 by means of which the inclination angle $\theta$ of the mounting rod to the perpendicular of the table top 10 may be read on the graduated scale 36.

Also supported from the frame member 40 are two depending members 51, 52 having inwardly extending fingers 53, 54 which serve as means for supporting the rotation circle 16. A knurled screw 55 passing through finger 54 serves as means for clamping the rotation circle 16 in a fixed position. The rotation circle 16 has a central bore 56 through which the crystal mounting rod 13 may pass. Fastened across this central bore and partially covering it is a straight piece of metal 57 which fits against the flat milled surface 37 of the mounting rod 13. Thus, when the mounting rod is passed through the bore 56, the rotation circle is keyed to it by means of the metal member 57. The rotation circle 16 is graduated in degrees around its outer surface and the depending member 52 is provided with a cooperating marker (not shown) for indicating the angle of rotation of the mounting rod 13. While the metal member 57 engages the milled surface of rod 13, it does not prevent longitudinal movement of the rod so that this rod can slide freely for adjustment purposes. The fingers 53 and 54, however, prevent rotation circle 16 from moving up or down with respect to the frame member 40. When the rotation circle is set to a desired position, the thumb screw 55 provides means for clamping the rotation circle to prevent further rotation of the rod without, however, affecting its longitudinal freedom of motion, the movement being controlled by the split chuck 47 and the knurled nut 48.

In Fig. 4 there are shown the source of collimated X-ray beam and the back reflection X-ray diffraction camera. The non-metallic plate 20, previously mentioned, which may be composed of any suitable insulating material, such as a molded phenolic resin, serves as means for supporting a metallic tank 60 in which is located a suitable X-ray tube 61 whose longitudinal axis is inclined at a small angle to the plane of the plate 20 so that an intense vertical X-ray beam is directed through a hole 62 in the plate 20. The plate 20 is provided on its lower surface with a groove 63 to allow the X-ray tube 61 to be tilted to this angle. The tank 60 may be filled with oil or any suitable insulating material. The tube 61 may be supplied with operating potential through leads 64 and may be cooled by water circulated in tubes 65. The upper surface of the dielectric plate 20 is provided with three holes 67 which serve as means for locating three pins 68 attached to the back reflection camera so that this camera is centered in the X-ray beam and oriented with respect to the standard direction defined by the metal straight edge 11 shown in Fig. 1.

The purpose of the back reflection X-ray diffraction camera 19 is to record on a photographic film 70 the X-rays diffracted from the surface of the quartz crystal when a collimated beam of X-rays impinges upon it. Rays which are diffracted in a more or less forward direction are absorbed by the crystal, while rays that are diffracted in a direction near that from which the primary X-ray beam comes are the only ones reliably available for recording. Accordingly, the camera 19 is provided to record back reflected X-rays.

The camera 19 comprises two shells 71 and 72 of any suitable high impervious material, such as spun copper or a suitably molded phenolic resin. The two shells are clamped together by means of latches 73, each of which is mounted on a latch yoke 74 of a respective one of the shells and engages a cooperating stud 75 on the other shell.

As may be seen in the exploded view of the camera 19 shown in Fig. 5, the upper shell 71 is pierced by the centrally located hole 21 which is covered on the inside of the shell by a piece of aluminum foil 76. The inner, or lower, rim of shell 71 is pierced by a plurality of holes 77, located the same radial distance from the center of the shell 71, and by three holes 78, located at a different radial distance from the center of shell 71. The holes 78 are spaced to receive the three locating pins 68 carried by the lower shell 72 and extending upwardly into the holes 78 and downwardly into the holes 67 of plate 20. The film 70, which is circular in shape and is provided at its center portion with a centering hole 80, is provided at its outer periphery with three notches 81 whose positions correspond to those of the pins 68. It is seen, therefore, that the pins 68 serve to locate the upper shell with respect to the lower, to locate, orient and center the film 70, and to locate, orient and center the entire camera with respect to the X-ray beam.

The latch yokes 74 which carry the latches 73 have a central bore 82, as shown in Fig. 4, which continues as a helical tube 83 protruding from the side of the shell opposite the stud 75. A gasket 85, shown in Fig. 4, of suitable material, such as neoprene, is cemented to the inner rim of the lower shell 72, outside of the holes 86 corresponding to the holes 77 in the upper shell 71, and serves to make the joint between the shells light and watertight.

The collimating system shown in Fig. 4a consists of a tube 88 of a suitable metal, such as brass, riveted into a hole in the center of the lower shell 72 and extending up to the level of the inner rim of this shell. A lead X-ray protection sheet 89 is located on the inner surface of the lower shell 72 surrounding the tube 88 and is held in place by nut 90 which engages external threads on tube 88. Inside the tube 88 are two metal inserts 91 and 92, formed preferably from type metal, which are drilled with centrally located holes. The top insert 92 is covered by a thin sheet of aluminum foil 93 which is held in place by a thin metal disk 94 having a small centered aperture. The upper surface of the metal disk 94 is flush with the tube 88 and with the upper surface of the inner rim of the lower shell, the pieces of aluminum foil 93 and 76 serving to make the collimating system light and watertight, while at the same time allowing X-rays to pass.

The common center line of the holes in the metal inserts 91 and 92 is perpendicular to the plane of the inner rim of the lower shell and passes through the center of the circle on which the locating pins 68 are fixed. The film 70, when in place in the camera, is centered by the locating pins 68 so that the center hole 80 is concentric with the axis of the collimating system. It is apparent that the locating pins 68 and the notches 81 do not fit together unless the film is in the one correct orientation, which orientation is permanently marked on the film by the notches 81. The film, of course, is placed in the camera 19 in a dark room. After the shells 71 and 72 are clamped together by the latches 73, the camera may be exposed to stronger light without damage to the film, the helical tubes 83 serving as light traps to prevent the entrance of light through the bores 82.

After the film is exposed, the tubes 83 serve as means to introduce developer into the camera in which it may be allowed to remain for a proper development time, the aligned holes 77 and 86 permitting passage of fluids between the shells 71, 72. The developer is then removed and first, washing water, and subsequently, fixer, introduced by the same tubes. Thus, with the exception of loading, no dark room is required for producing a picture of the diffraction pattern. Preferably, when the developer is introduced, the camera is held in a vertical position so that the latches 73 are one above the other and the developer is forced into the lower tube 83 through a flexible connection until it begins to flow out through the upper helical tube. Water and fixer may be introduced in this same manner.

In the operation of the crystal orienting apparatus thus far described, the optical axis of the irregularly faced crystal 12 is first approximately located by any suitable method, such as by means of polarized light. Such methods are well known in the art and need not be described in detail here. It may be expected that such a determination is correct to 30° or less and, in this specification and the accompanying claims, wherever the term "approximate optical axis" is used, the term is used to refer to an optical axis determined by such a method. Thereafter, the crystal is cemented to the holder 13 with this approximate optical axis direction lying parallel to the longitudinal axis of a mounting rod 13. The mounting rod 13 is placed within the split chuck 47 and the azimuth circle, the inclination semicircles, and the rotation circle are all set at their zero points. Thereafter, the crystal 28 is lowered until it touches the upper surface of the shell 71 of camera 19 and is clamped in this position by means of chuck 47 and nut 48. By sliding the frame 18 along the straight edge 11 and the plate 17 bearing the azimuth circle along the bearing surface 27 of frame 18, the lowermost point of crystal 12 may be placed directly over the opening 21 in camera 19.

With the camera and quartz crystal thus in position, an exposure is made by energizing the X-ray tube 61, the time of the exposure being determined, of course, by the operating voltage, the space current, and the characteristics of the tube employed. The camera 19 may then be removed from the orienting apparatus and the film developed and fixed without removing from the camera.

The film goniometer 100, shown in Figs. 6 and 7, is a device for determining from the film obtained according to the above described method, the angles to be set on the crystal goniometer to give the crystal proper orientation for cutting. The film goniometer comprises a light box 101, having mounted thereon a rotation circle 102, a circular slide plate 103 bearing an inclination scale 104, a slide 105 carrying an azimuth scale 106, and a combined ring 107 and straight edge 108. The light box 101 has a centrally located opening 109 below which is located a source of light which is conventionally shown in Fig. 7 as a light bulb 110. The rotation circle 102, which has a center opening 112 overlying the opening 109 at light box 101, is secured on the upper surface of the light box 101 by means of the screws 111. On the upper surface of the outer portion of the rotation circle, a scale, marked in degrees, is engraved counterclockwise. The inner portion of the rotation circle is of reduced thickness and the opening 112 has a beveled shoulder for supporting a circular piece of glass 113 of the type which will diffuse the light rays from the light source 110. The film 70 lies upon the upper surface of the pane of glass 113. Spaced about the periphery of the opening 112 are three locating pins 114 whose spacing corresponds to that of the three locating pins 68 in the back reflection camera and which serve to center and orient the film being measured.

The slide plate 103 is a circular plate which fits inside a raised edge of the rotation circle so that its upper surface is flush with the engraved surface of the rotation circle. On its edge is engraved an indicator mark 115 by means of which its angular position can be read. Parallel to the radius terminating in the indicator mark 115 are two straight slide bearings 117 which bound two sides of a somewhat rectangular hole 116 in the plate. The bottom side of this hole 116 is a straight edge perpendicular to the slide bearings 117 and the upper side of the hole is formed by a circular arc concentric with the plate and of a slightly smaller radius. Along the right-hand edge of the opening 116 on the slide plate 103 is engraved the inclination scale or indicia 104 whose zero point is at the point where a perpendicular to the slide bearing 117 passes through the center of the slide plate.

The slide 105 is a somewhat rectangular plate whose two parallel sides are machined to fit the slide bearings 117 of the slide plate 103 and, when supported in these slide bearings, the upper surface of slide 105 is flush with the upper surface of the slide plate 103. The upper edge of slide 105 is an arc of a circle whose diameter is the same as that of the circular side of opening 116. Thus, when the slide 105 is pushed to its extreme upper position, the circular arcs of the slide and slide plate meet. The slide plate has a central aperture or opening 118 overlying the openings 109 and 112 and, when the slide is in its lowermost position, the center of this opening coincides with the center of the openings 109 and 112. The graduations of the azimuth circle 106 are engraved counterclockwise about the central opening 118 on the slide 105 and the zero mark of the scale 106 is located along the radius of the slide's central opening which is perpendicular to the right-hand slide bearing 117. A continuation 119 of the zero mark of the scale 106 serves as a marker or indicator for the inclination scale 104.

The circular ring 107 rests on a bearing surface 120 around the central opening 118 of the slide plate so that the upper surfaces of the slide plate 105 and the ring 107 are flush. Engraved on ring 107 is an indicating mark 107' cooperating with scale 106 to indicate the angular movement of ring 107. Integrally attached to the ring 107 and extending across its center is the reading arm 121 which has a straight edge 108 lying along a radius of the ring and which carries an indicator mark 122 which cuts the straight edge at the center of the ring. The straight edge is supported by the ring 107 just sufficiently high enough above the glass plate 113 at the center of the rotation circle that it clears the film locating pins 114.

As stated previously, one of the results to which my method and apparatus for orienting irregular quartz crystals is directed is the mounting of these quartz crystals on a suitable mounting plate in such a way that their optical axes are parallel to a vertical edge of a mounting plate and that their mechanical axes are parallel to a horizontal edge of the mounting plate. The starting material consists of irregular crystals so marked that the direction of the optical axis is known within 30°. Within a quartz crystal there are six apparently similar directions which are arranged in such a way that there is a direction of three-fold rotational symmetry, which is the optical axis, and that there are three directions of two-fold rotational symmetry, which are the electrical axes. If the crystal is turned 120° or 240° about an axis parallel to the optical axis, or three-fold rotational symmetry direction, or is turned 180° about an axis parallel to any one of the electrical axes, or two-fold rotational symmetry directions, the crystal presents the same pattern. A plane perpendicular to the three-fold direction is parallel to the three two-fold directions, which makes angles of 120° and 240° with one another.

An X-ray beam impinging upon a quartz crystal, instead of finding six equivalent directions, finds twelve, namely, each of the truly equivalent directions and its reverse direction. As a result of this property of the crystal, an X-ray diffracted thereby is given a diffraction pattern which evidences a false symmetry resulting from the crystal symmetry plus a center of inversion. In the case of quartz, the X-ray effects have the point group $D_{3d}$—$3m$, which means that the crystal can be reflected across a plane perpendicular to any of its two-fold axes without affecting its diffraction pattern. Of course, the operation of any of the true symmetry elements, i. e., the two- and three-fold axes, also leaves the pattern unchanged.

The back reflection X-ray diffraction pattern of a crystal consists of an array of spots which can be thought of as being reflections of the primary X-ray beams from the various crystallographic planes. In a quartz crystal, these planes are parallel to planes which cut two of the electrical axes and the optical axis at predetermined distances from the common intersection. If the optical axis is parallel to the primary X-ray beam, the diffraction pattern consists of six identical wedge-shaped regions with their points meeting at the center. In Fig. 9, reference numeral 123 designates one of these six identical wedge-shaped regions and the center is designated by the numeral 124. In this figure the center of the pattern coincides with the central aperture 80 in the film. The dividing lines, such as the line 125, between these regions are marked by straight lines densely strewn with rather intense spots. The pattern on one side of each of these dividing lines is a mirror image of the pattern on the other. These dividing lines are composed of reflections from crystal planes of a certain type, included among which are planes parallel to the major and minor pyramid faces of the crystal if these faces were developed. Bisecting the angle between two neighboring dividing lines 125 are less strongly marked lines of spots, such as the lines 126, which die off in intensity toward the center of the pattern. These two sets of lines, the strongly marked lines 125 which are reflection lines of the symmetry of the pattern and the weakly marked lines 126 which are not, are referred to in the following discussion as the hexagonal cross of the pattern. It is by means of this hexagonal cross that the orientation of the quartz crystals is determined in the method now being described. Fig. 9 shows a diffraction pattern from a quartz crystal with its optical axis parallel to the X-ray beam on which the hexagonal cross appears as just described.

If one imagines a quartz crystal to carry with it a set of six planes intersecting along the optical axis at angles which are multiples of 30° to one another so that they parallel the mechanical and electrical axes, the hexagonal cross in the diffraction pattern discussed above is the same as the pattern where these planes cut the film 70. Thus, the heavily marked lines 125 are parallel to the mechanical axes of the crystal and the lightly marked lines 126 are parallel to the electrical axes. If the edge of the circular film 70 is divided into degrees, the angle that any one of these axes makes with a set direction can be read.

The film 70 is provided with three notches 81 which fit the locating pins 68 of the camera 19 and the film goniometer 100 so that the angles any of the mechanical or electrical axes make with the standard direction defined by the straight edge 11 can be read on the film goniometer. The azimuth circles of the two instruments, that is, the crystal goniometer 22 and the film goniometer 100 are so graduated that the angular reading of an axis on the film goniometer may be set on the crystal goniometer to place that axis of the crystal 12 perpendicular to the standard direction. Consequently, a diffraction pattern made on this apparatus of a quartz crystal, whose optical axis is parallel to the mounting rod 13, allows its orientation.

On the symmetrical diffraction pattern shown in Fig. 9, there is an intense spot on each of the heavy arms of the hexagonal cross equally spaced a short distance from the center 124. Three of these spots 128, which are at the corners of an equilateral triangle, are more intense than the others. Each of the more intense spots 128 is across the center of the cross from a less intense spot 129. The more intense spots are below major pyramids on the bottom of the quartz crystals. The less intense spots are below minor pyramids. By means of these spots, the orientation of the major and minor faces of a crystal can be found, even if, as in the case of irregular crystals, these faces are not developed. If the straight edge 108 of the film goniometer is set along an arm of the hexagonal cross which carries a major face spot and this azimuth is then set on the crystal goniometer, the major faces on the bottom of the crystal will have azimuths of 0°, 120° and 240°, while those on top will have azimuths of 60°, 180° and 300°.

The diffraction pattern of Fig. 10 is one which is given by a quartz crystal when the optical axis of the crystal is inclined slightly to the X-ray beam. In such a pattern, the hexagonal cross is no longer centered in the diffraction pattern. Instead, in such a pattern the center 131 of the hexagonal cross is displaced from the center 132 of the film by a small distance. The shape and intensity of the pattern, moreover, is no longer exactly symmetrical, but instead, the arms 125' and 126' corresponding to the arms 125 and 126 of the pattern of Fig. 9 of the cross are slightly curved and the angles between these arms are no longer exactly multiples of 30° where they cross. If the inclination of the optical axis to the X-ray is not too great, however, for example, not more than 30°, the cross is still nearly enough hexagonal and its arms are nearly enough straight so that it can be recognized and used for measuring. On Fig. 10, also, the spots 128' may be noted corresponding to the spots 128 of Fig. 9.

In order to orient fully the crystal 12 for purposes of cutting, three angles are required; the rotational angle $\chi$, which is measured by the azimuth on the film of the center of the hexagonal cross; the inclination angle $\theta$, which is measured by the distance from the center of the film to the center of the hexagonal cross; and the azimuth angle $\phi$, which is the angle between a line from the center of the film to the center of the cross and the desired arm of the cross. The distance from the center of the film to the center of the hexagonal cross used in measuring the angle $\theta$ is proportional to the distance between the lowermost point of the crystal 12, when mounted in the goniometer of Fig. 1, and the film 70 within the camera 19. Since, when the crystal is originally placed in position prior to exposure to the X-ray beam, the lowermost point of the crystal is made flush with the top of the shell 71 of camera 19, if the distance from the top of this shell to the film is, for example, one-half inch, then the value of the distance from the center of the film 132 to the center of the hexagonal cross 131, in inches, equals ½ tan 2θ. All of the above distances and angles are measured by fitting the film 70 onto the pins 114 of the film goniometer with all of its scales set to zero, rotating the slide plate until the straight edge 108 is along the line from the center 132 of the film to the center 131 of the hexagonal cross, moving the slide 105 until the indicator 122 of the straight edge 108 is at the center of the cross, and rotating the inner ring 107 until this straight edge lies along the desired arm 125' of the cross (or more strictly speaking, along the tangent at the cross center 131 to the desired arm 125' of the cross). The rotation circle scale 102', the inclination scale 104, and the azimuth scale 106 are so graduated that, by setting the angles read on the corresponding scales 34, 36 and 16 of the crystal goniometer, the crystal is oriented with its optical axis exactly vertical and its selected mechanical axis almost exactly parallel to the standard direction defined by the straight edge 11.

In Fig. 11 is shown apparatus for mounting the crystal 12 after it has been oriented in the above defined manner. The mounting plate 140 is a rectangular plate held in exactly vertical position by means of a support 141 and a thumb screw 142 used for clamping the plate to the support. The support 141 has three pins 143, extending below its lower surface, whose spacing corresponds to the spacing of the holes 67 in the plate 20 of the table top 10. When the pins 143 are placed in the holes 67, the plate 140 is oriented so that its broader face (not shown) is parallel to the standard direction defined by the straight edge 11.

After the crystal has been properly oriented, as above outlined, the mounting plate 140 is placed in position and the azimuth circle plate 17 and the frame 18 are moved until the crystal is in contact with the mounting plate 140. The crystal is then cemented to the mounting plate and the joint between the crystal and the mounting rod 13 is broken. The crystal is then mounted ready to be cut. As above mentioned, the optical axis of the crystal is oriented so that it is exactly vertical and the selected mechanical axis of the crystal is almost exactly parallel to the mounting plate. The mechanical axis is more accurately parallel to the mounting plate if its azimuth angle read on the inner ring 107 of the film goniometer is close to 90° or 270°. Greatest accuracy is obtained for reading between 90° and 120° or between 240° and 270°.

From the foregoing, it may be seen that my invention provides a means and method for orienting irregular quartz crystals which determines its optical and electrical axes with a high degree of precision. In the use of apparatus of the type described for orienting a large number of crystals, it has been found that, when oriented in the manner outlined above, the optical axis and the pyramid faces of the crystals are determined with precise accuracy in all instances. Moreover, it has been found that there is no necessity for checking the accuracy of the orientation by obtaining a second X-ray diffraction pattern. As a result of my invention, moreover, it has been discovered that irregular quartz crystals, which usually have been split, in mining and in subsequent handling, along a twinning surface so that the amount of twinning surface of the remaining crystal is smaller than that usually encountered in crystals having natural surfaces, are more desirable, from a manufacturing point of view, than crystals having natural faces.

While I have shown a preferred embodiment of my invention, it will of course be obvious that many modifications may be made. Thus, for example, while I have discussed my film goniometer as being employed for measuring angles of back reflection X-ray diffraction patterns, it will be apparent that it may also be used for measuring forward reflection X-ray diffraction patterns, or in any other instance where projected patterns of spaced points of an object are being studied and certain angles are to be measured. It will be understood, therefore, that I do not wish to be limited to the particular embodiment shown since various modifications may be made and I contemplate by the appended claims to cover any such modifications as fall within the true spirit and scope of my invention.

What I claim as new and desire to secure by Letters Patent of the United States is:

1. The method of orienting an irregular quartz crystal which includes determining an approximate optical axis of said crystal, impinging an X-ray beam on said crystal along said approximate axis, intercepting a reflected X-ray beam from said crystal on a light-sensitive film, and determining the true directions of the axes of said crystal from the reflected X-ray diffraction pattern produced on said film.

2. The method of orienting an irregular quartz crystal which includes determining an approximate optical axis of said crystal, impinging an X-ray beam on said crystal along said approximate axis, intercepting a back reflected X-ray beam from said crystal on a light-sensitive film, and determining the true direction of the optical axis of said crystal from the back reflected X-ray diffraction pattern produced on said film.

3. The method of determining a desired axis of a quartz crystal which includes impinging an X-ray beam on said crystal along an approximate optical axis, intercepting an X-ray beam reflected from said crystal on a light-sensitive film, and determining said desired axis from the figures produced by said reflected beam on said film.

4. The method of determining a desired axis of an irregular quartz crystal which includes impinging an X-ray beam on said crystal along an approximate optical axis, intercepting an X-ray beam reflected backwardly from said crystal on a light-sensitive film, and determining said desired axis from the back reflection X-ray pattern produced by said reflected beam on said film.

5. The method of determining the electrical axes of a piezo-electric crystal which includes impinging an X-ray beam on said crystal along an approximate optical axis, intercepting an X-ray beam reflected from said crystal on a light-sensitive film, and determining said axes from the figures produced by said reflected beam on said film.

6. The method of orienting an irregular crystal which includes determining an approximate optical axis of said crystal, supporting said crystal with said approximate axis perpendicular to a light-sensitive film, impinging an X-ray beam on said crystal along said approximate axis, intercepting a reflected X-ray beam from said crystal on said film, and determining the true axes of said crystal from the reflected X-ray diffraction pattern produced on said film.

7. The method of orienting an irregular quartz crystal which includes determining an approximate optical axis of said crystal, supporting said crystal with said approximate axis perpendicular to a light-sensitive film, impinging an X-ray beam on said crystal along said approximate axis, intercepting a back reflected X-ray beam from said crystal on said film, and determining the true optical axis of said crystal from the back reflected X-ray diffraction pattern produced on said film.

8. The method of orienting an irregular quartz crystal which includes determining a direction which is inclined at an angle of less than thirty degrees to an optical axis of said crystal, supporting said crystal above a light sensitive film with said direction substantially vertical to said film, projecting a collimated X-ray beam on said crystal through said film and along said direction, intercepting a back reflected X-ray beam from said crystal on said film, determining the true optical axis of said crystal from the back reflected X-ray diffraction pattern produced on said film, and mounting said crystal with said true optical axis in a desired position.

9. The method of orienting an irregular quartz crystal which includes determining a direction which is inclined at an angle of less than thirty degrees to an optical axis of said crystal, supporting said crystal above a light-sensitive film with said axis substantially vertical to said film, projecting a collimated X-ray beam on said crystal, through said film and along said axis, intercepting a back reflected X-ray beam from said crystal on said film, determining the true optical axis and a mechanical axis of said crystal from the back reflected X-ray diffraction pattern produced on said film, and mounting said crystal with said true optical axis and said mechanical axis in desired positions.

10. The method of orienting an irregular quartz crystal which includes determining an approximate optical axis of said crystal, supporting said crystal in a goniometer above a light sensitive film with said axis substantially vertical to said film, projecting a collimated X-ray beam on said crystal along said axis, determining the true optical axis of said crystal from the back reflected X-ray pattern produced on said film, and orienting said goniometer in accordance with said pattern to place said true optical axis in a vertical position.

11. The method of orienting an irregular quartz crystal which includes determining an approximate optical axis of said crystal, supporting said crystal in a goniometer above a light-sensitive film with said axis substantially vertical to said film, projecting a collimated X-ray beam through the center of said film along said axis, intercepting a back reflected X-ray beam from said crystal on said film, determining the true optical axis and the angle of inclination with a standard direction of a mechanical axis on said crystal from the back reflected X-ray pattern produced on said film, and orienting said goniometer in accordance with said pattern to place said true optical axis in a vertical position and said mechanical axis at a desired angle with said standard direction.

12. Apparatus for orienting an irregular piezo-electric crystal comprising, means for supporting said crystal with an approximate axis thereof in a predetermined position, a source of X-rays, means to project an X-ray beam from said source on said crystal along a line parallel to said axis, and means to intercept X-rays reflected backwardly from said crystal, said last means comprising a substantially flat light-sensitive film interposed between said source and said crystal.

13. The combination in an X-ray device for examination of a piezo-electric crystal, of means to support a substantially flat X-ray film in proximity to a point on said crystal and at right angles to a characteristic axis thereof, and means to project a beam of X-rays through said film on to said crystal along said axis whereby said X-rays are reflected back on said film to form a figure thereon.

14. The combination, in an X-ray device for examination of a piezo-electric crystal, of means to support an X-ray film in proximity to a point on the surface of said crystal and at right angles to a characteristic axis thereof, means to project a beam of X-rays parallel to said characteristic axis through a point on said film to said point on said crystal whereby said X-rays are reflected back on said film to form a figure characteristic of said crystal, said figure extending about said point on said film.

15. Apparatus for orienting an irregular piezo-electric crystal comprising, a goniometer, means for supporting said crystal in said goniometer with an approximate axis thereof in a predetermined position, a source of X-rays, means to project an X-ray beam from said source on said crystal along a line parallel to said axis, and means to intercept X-rays reflected backwardly from said crystal, said last means comprising a substantially flat light-sensitive film interposed between said source and said crystal.

16. In a system for orienting an irregular piezo-electric crystal, the combination of, a light-sensitive film having an aperture therein, means for supporting said crystal with its lowermost point spaced a predetermined distance above said aperture and its approximate optical axis substantially vertical thereto, a source of X-rays, and means to project a beam of X-ray from said source through said aperture and along said axis to produce on said film a back reflected X-ray diffraction pattern.

17. In a system for orienting an irregular piezo-electric crystal, the combination of, a light-sensitive film having an aperture therein, means for supporting said crystal with its lowermost point spaced a predetermined distance above said aperture and its approximate optical axis substantially vertical thereto, said means including a goniometer, a source of X-rays, means to project a beam of X-rays from said source through said aperture and along said axis to produce on said film a back reflected X-ray diffraction pattern, and means whereby said goniometer may be oriented to place the true optical axis of said crystal determined from said pattern in a desired position.

18. Apparatus for determining the mechanical axes and the true optical axis of a quartz crystal having no natural faces and a predetermined approximate optical axis comprising, a goniometer having a reference line associated therewith, a light-sensitive film, means whereby said film may be supported in a predetermined position with respect to said line, means to support said crystal in said goniometer with the lowermost point of said crystal spaced a predetermined distance above said film and said approximate axis substantially vertical to said film, a source of X-rays, means to project a beam of X-rays from said source along said approximate axis to produce on said film a back reflected X-ray diffraction pattern, and means whereby said goniometer may be oriented to place said true optical axis determined from said pattern in a vertical position and a mechanical axis determined from said pattern at a desired angle to said reference line.

19. Apparatus for orienting a quartz crystal having no natural faces and a predetermined approximate optical axis comprising a goniometer having a reference line associated therewith, a light-sensitive film having an aperture therein, means whereby said film may be supported in a predetermined position with respect to said line, means to support said crystal in said goniometer with the lowermost point of said crystal spaced a predetermined distance above said aperture and said approximate axis substantially vertical to said film, a source of X-rays, means to project a beam of X-rays from said source through said aperture along said approximate axis to produce on said film a back reflected X-ray diffraction pattern, means whereby the true optical axis and the mechanical axes of said crystal may be determined from said pattern, and means whereby said goniometer may be oriented to place said true optical axis in a vertical position and a mechanical axis at a desired angle with said reference line.

20. Apparatus for orienting an irregular quartz crystal having a predetermined approximate optical axis comprising, means for supporting said crystal, a source of X-rays, means to project a colimated beam of X-rays from said source on said crystal along said axis, means to intercept X-rays reflected backwardly from said crystal, said last means comprising a flat light-sensitive film interposed between said source and said crystal, and means whereby the angle between said approximate axis and the true optical axis of said crystal may be determined from the back reflection X-ray diffraction pattern produced on said film.

21. Apparatus for orienting an irregular quartz crystal having a predetermined approximate optical axis comprising, means for supporting said crystal, a source of X-rays, means to project a collimated beam of X-rays from said source on said crystal along said axis, means to intercept X-rays reflected backwardly from said crystal, said last means comprising a light-sensitive film interposed between said source and said crystal, means whereby the angle between said approximate axis and the true optical axis of said crystal may be determined from the back reflection X-ray diffraction pattern produced on said film, and means whereby said supporting means may be rotated through said angle to place said true optical axis parallel to said beam.

DAVID HARKER.